Dec. 6, 1955  J. R. WELTER  2,725,946
TRACTION LEVER STRUCTURE
Filed Dec. 15, 1952

INVENTOR.
JEFF R. WELTER
BY Lyon & Lyon
ATTORNEYS

United States Patent Office 2,725,946
Patented Dec. 6, 1955

2,725,946

TRACTION LEVER STRUCTURE

Jeff R. Welter, Pacoima, Calif.

Application December 15, 1952, Serial No. 326,115

4 Claims. (Cl. 180—19)

My invention relates to traction lever structures and included in the objects of my invention are:

First, to provide a traction lever structure which involves an elongated lever bar, a short prying blade and a power driven pair of fulcrum rollers adjacent the prying blade so that the blade may be inserted under an edge of a box or other large object in order to lift the object slightly whereupon the fulcrum rollers may be power operated to drag or push the object while being guided by the lever bar.

Second, to provide a traction lever structure which is particularly compact and especially designed for hand manipulation in crowded quarters, such as in warehouses, holds of vessels, boxcars or freight-carrying aircraft.

With the above and other objects as may appear hereinafter, reference is directed to the accompanying drawings in which.

Figure 1:
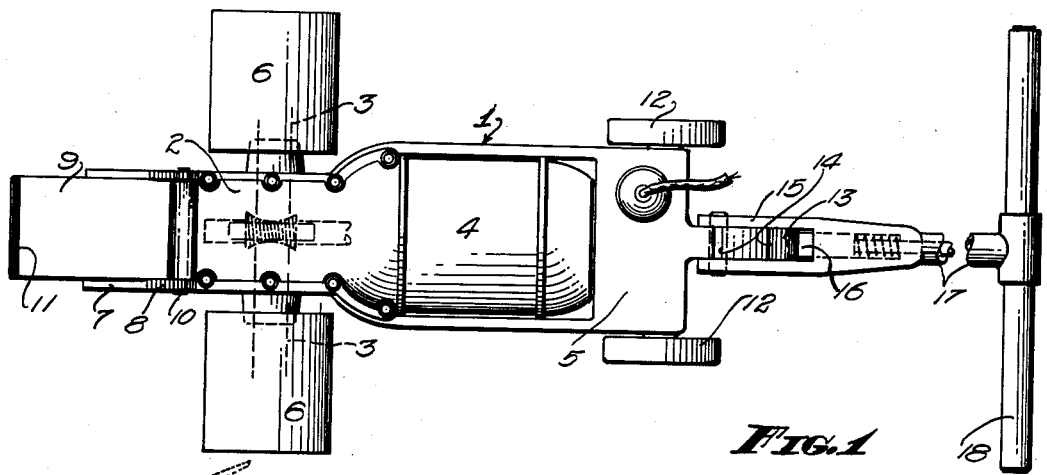
Figure 1 is a plan view of my traction lever structure with the handle lever shown fragmentarily.

My traction lever structure includes a frame 1, at one end of which is formed a gear box 2 which contains a reduction gear unit, such as a worm and worm gear drive in order to rotate at low speed and at high torque a laterally extending drive shaft 3. The central portion of the frame is recessed to provide space in which is mounted an electric motor 4 operatively connected with the gears contained in the gear box 2. The end of the frame 1 opposite the gear box is provided with a small compartment 5 in order to house the necessary electrical connections (not shown).

The extremities of the drive shaft 3 carry the fulcrum and drive wheels 6 which support the forward end of the frame 1.

Figure 2:
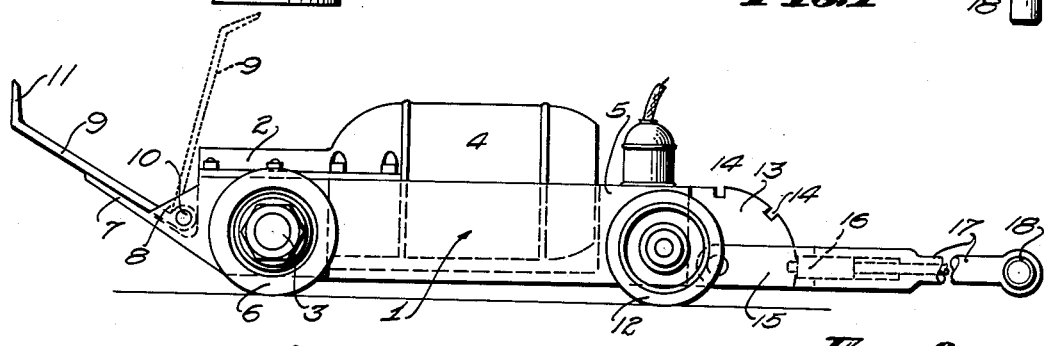
Figure 2 is a side view of the traction lever structure.

Welded or otherwise secured to and forming a part of the frame 1 is a forwardly and upwardly directed prying blade 7, the root end of which may be reinforced by side ends 8. The extremity of the prying blade is relatively sharp and arranged to be inserted under an edge of a box or other object to be moved. The underside of the prying blade defines a plane which is tangent to a circle slightly smaller than the drive wheels 6 so that the frame may be tilted until the blade is parallel to or resting on the surface which supports the drive wheels. It is intended that the extremity of the prying blade clear by only a few inches the surface which supports the drive wheels. At times however it is desired to insert the blade under objects which may be spaced a greater distance from the floor or other surface than the prying blade. This is accomplished by an extension blade 9 which overlies the blade 7 and is provided with a pivot pin 10 which extends between the ends or webs 8. The extension blade is adapted to overlie the blade 7 when in use as shown by the solid lines in Figures 1 and 2, or to be tilted vertically clear of the prying blade 7 when not in use as indicated by broken lines in Figure 2. If desired, the extremity of the extension blade 9 may have an upturned lip 11.

The opposite or rear end of the frame 1 is supported by idler wheels 12, one on each side thereof.

The rear end of the frame is provided with a rearwardly directed quadrant web 13 defining an upwardly and rearwardly directed quarter-circle in which is formed notches 14. A yoke 15 straddles the quadrant 13 and is pivotally attached thereto at the axis of the quadrant. The yoke carries a latch 16 adapted to engage the notches 14 to lock the yoke in various angular relations with the frame 1. The yoke 15 is arranged for attachment to a lever arm 17 which is of substantial length as compared to the length of the frame 1. The extremity of the lever arm 17 is provided with a cross handle 18.

Suitable means (not shown) is provided in the lever arm 17 or handle 18 for the purpose of operating the latch 16. Also the handle, or the lever arm adjacent the handle, may carry a suitable switch (not shown) for control of the motor 4. The motor and the switch preferably are so arranged that the motor may be caused to drive the fulcrum wheels forwardly or rearwardly.

Figure 3:
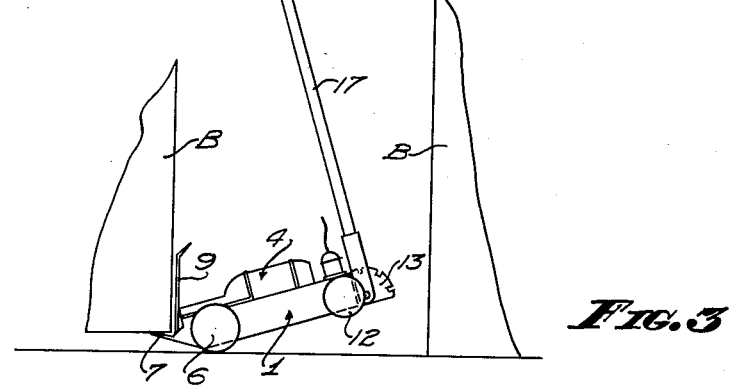
Figure 3 is a reduced, substantially diagrammatical side view of the traction lever structure showing the manner in which it may be manipulated in close quarters.
Figure 4:
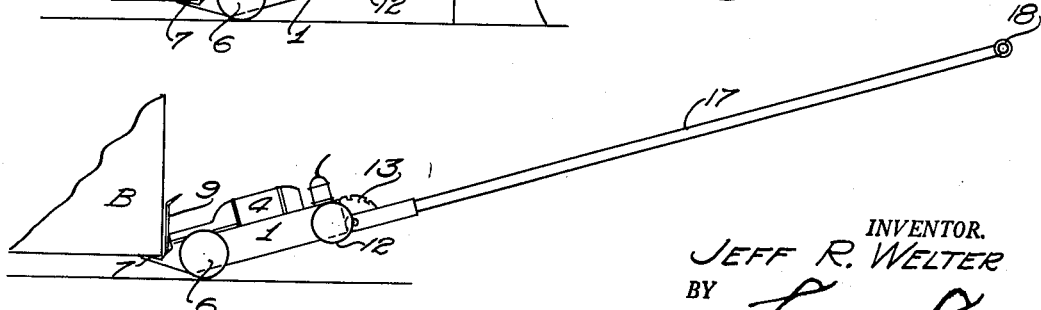
Figure 4 is a similar, substantially diagrammatical side view illustrating the mode of operation where space permits.

Typical operations of my traction lever structure are shown in Figures 3 and 4. Figure 4 shows a normal use of the traction lever structure in which the elongated lever arm 17 is in substantial alignment with the frame 1. It will be observed that the prying blade 7 is extremely close to the fulcrum and drive wheels 6 and a powerful lifting force may be exerted under a box B or other container or object by bearing down on the handle 18. Once the weight of the object is carried by the prying blade it is possible to manipulate such box or object by driving the wheels 6 forwardly or rearwardly.

The forward end of the frame forms a stop shoulder which acts directly, when the extension blade 9 is extended, to limit the depth of the blade; and which acts indirectly by backing the blade 9 in its raised position to limit the depth of insertion of the blade 7.

As shown in Figure 3, the lever arm 17 may be disposed in a right angular position relative to the frame 1 in order that the device may be manipulated within an extremely small space as represented by the distance between the two boxes B.

Having fully described my invention, it is to be understood that I do not wish to be limited to the details herein set forth, but my invention is of the full scope of the appended claims.

I claim:

1. A traction lever structure, comprising: an electric motor having a gear unit at one end including a drive shaft disposed at right angles to the axis of the motor; a pair of traction rollers mounted on said shaft; a frame at its forward end secured to said gear unit and closely enveloping the lower portion of said motor; the forward end of said frame forming a stop shoulder and a prying blade extending forwardly from the lower side of said stop shoulder; an elongated handle; and means at the rear end of said frame beyond said motor for adjustably connecting said handle to said frame in various angular positions, said prying blade adapted to be inserted under the corner of a load to the extent limited by contact of said load with said stop shoulder whereupon said traction wheels may drag or push said load.

2. A traction lever structure, comprising: an electric motor having a gear unit at one end including a drive shaft disposed at right angles to the axis of the motor; a pair of traction rollers mounted on said shaft; a frame at its forward end secured to said gear unit and closely enveloping the lower portion of said motor; the forward end of said frame forming a stop shoulder and a prying blade extending forwardly from the lower side of said stop shoulder; an elongated handle; means at the rear end of said frame beyond said motor for adjustably connecting said handle to said frame in various angular positions, said prying blade adapted to be inserted under the corner of a load to the extent limited by contact of said load with said stop shoulder whereupon said traction wheels may drag or push said load; and idler wheels at the rear end of said frame.

3. A traction lever structure as set forth in claim 1, wherein: an extension blade is pivotally connected to said prying blade adjacent said stop shoulder and is movable between an operating, forwardly directed, position overlying said stop shoulder and an inoperative, upwardly directed, position backed by said stop shoulder.

4. A traction lever structure as set forth in claim 2, wherein: an extension blade is pivotally connected to said prying blade adjacent said stop shoulder and is movable between an operating, forwardly directed, position overlying said stop shoulder and an inoperative, upwardly directed, position backed by said stop shoulder.

References Cited in the file of this patent

UNITED STATES PATENTS

| | | |
|---|---|---|
| 794,741 | Pray | July 18, 1905 |
| 1,024,469 | Ballinger | Apr. 23, 1912 |
| 1,292,022 | Newman et al. | Jan. 21, 1919 |
| 2,091,823 | Large | Aug. 31, 1937 |
| 2,576,727 | Segesman | Nov. 27, 1951 |